(12) United States Patent
Power

(10) Patent No.: US 11,231,044 B2
(45) Date of Patent: *Jan. 25, 2022

(54) GAS TURBINE ENGINE AIRFOIL SHAPED COMPONENT

(71) Applicant: Rolls-Royce Corporation, Indianapolis, IN (US)

(72) Inventor: Bronwyn Power, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 617 days.

This patent is subject to a terminal disclaimer.

(21) Appl. No.: 16/176,250

(22) Filed: Oct. 31, 2018

(65) Prior Publication Data

US 2019/0072103 A1 Mar. 7, 2019

Related U.S. Application Data

(62) Division of application No. 15/048,611, filed on Feb. 19, 2016, now Pat. No. 10,145,383, which is a (Continued)

(51) Int. Cl.
*F04D 29/32* (2006.01)
*F01D 5/14* (2006.01)
*F04D 29/54* (2006.01)

(52) U.S. Cl.
CPC ........... *F04D 29/324* (2013.01); *F01D 5/141* (2013.01); *F04D 29/544* (2013.01); (Continued)

(58) Field of Classification Search
CPC ...... F04D 29/324; F04D 29/544; F01D 5/141; F05D 2250/70; F05D 2200/23; F05D 2240/301; Y02T 50/673
See application file for complete search history.

(56) References Cited

U.S. PATENT DOCUMENTS 3,024,967 A 3/1962 Wilde et al.
4,431,376 A * 2/1984 Lubenstein ............. F01D 5/141
416/223 A
(Continued)

FOREIGN PATENT DOCUMENTS

GB 2085976 A 5/1982
WO WO 2010/057627 A1 5/2010

OTHER PUBLICATIONS

European Office Action dated Aug. 10, 2015 for European Application No. 11250941.9, Applicant, Rolls-Royce Corporation (5 pages).
(Continued)

*Primary Examiner* — Kenneth Bomberg
*Assistant Examiner* — Adam W Brown
(74) *Attorney, Agent, or Firm* — Barnes & Thornburg LLP

(57) ABSTRACT

An apparatus comprises a gas turbine engine having a compressor for increasing a total pressure of a working fluid prior to delivery to a combustor for mixing with fuel. The compressor has a plurality of airfoil members that extend between a first flow surface and a second flow surface. The plurality of airfoil members have a first camber shape at a tip portion that provides a cumulative integral according to the relationship $$0.4 < \frac{\int_0^1 \left[ \int_0^x \beta' dx \right] dx}{\int_0^1 \beta' dx} \leq 0.5$$

where x is chord location,
(Continued)

Normalized Beta Distributions vs. Normalized Chord $$\beta' = \frac{\beta_i - \beta}{\beta_i - \beta_e},$$

$\beta_i$ is inlet metal angle, $\beta_e$ is exit metal angle, and $\beta$ is a camber angle at a given chord location.

8 Claims, 7 Drawing Sheets

Related U.S. Application Data division of application No. 13/337,109, filed on Dec. 24, 2011, now Pat. No. 9,309,769.

(60) Provisional application No. 61/427,720, filed on Dec. 28, 2010.

(52) U.S. Cl.
CPC .... *F05D 2200/23* (2013.01); *F05D 2240/301* (2013.01); *F05D 2250/70* (2013.01); *Y02T 50/60* (2013.01)

(56) References Cited

U.S. PATENT DOCUMENTS

| | | | |
|---|---|---|---|
| 4,682,935 A | 7/1987 | Martin | |
| 5,525,038 A | 6/1996 | Sharma et al. | |
| 6,264,429 B1* | 7/2001 | Koeller | F04D 29/324 |
| | | | 416/223 A |
| 6,299,412 B1 | 10/2001 | Wood et al. | |
| 6,331,100 B1 | 12/2001 | Liu et al. | |
| 6,428,281 B1 | 8/2002 | Botrel et al. | |
| 6,572,332 B2 | 6/2003 | Harvey et al. | |
| 6,802,695 B2 | 10/2004 | Haller | |
| 7,204,676 B2 | 4/2007 | Dutton et al. | |
| 7,217,101 B2 | 5/2007 | Harvey | |
| 7,287,958 B2 | 10/2007 | Henning et al. | |
| 7,419,353 B2 | 9/2008 | Guemmer | |
| 9,309,769 B2* | 4/2016 | Power | F04D 29/544 |
| 2003/0194327 A1* | 10/2003 | Bradbury | F04D 29/384 |
| | | | 417/53 |
| 2006/0165520 A1 | 7/2006 | Guemmer | |
| 2008/0118362 A1* | 5/2008 | Hu | F01D 5/141 |
| | | | 416/223 A |
| 2010/0054946 A1 | 3/2010 | Orosa et al. | |
| 2010/0150729 A1 | 6/2010 | Kirchner et al. | |
| 2011/0202321 A1 | 8/2011 | Lung et al. | |
| 2012/0163988 A1* | 6/2012 | Power | F04D 29/324 |
| | | | 416/243 |
| 2018/0058456 A1* | 3/2018 | Guemmer | F01D 5/142 |

OTHER PUBLICATIONS

Extended European Search Report, EP 11 25 0941, Applicant, Rolls-Royce Corporation, dated Apr. 2, 2012 (6 pages).
Extended European Search Report, EP 16 18 5808, Applicant, Rolls-Royce Corporation, dated Feb. 2, 2017 (7 pages).

* cited by examiner

GAS TURBINE ENGINE AIRFOIL SHAPED COMPONENT

CROSS-REFERENCE TO RELATED APPLICATIONS

The present application is a divisional of U.S. patent application Ser. No. 15/048,611 filed Feb. 19, 2016, which is a divisional of U.S. patent application Ser. No. 13/337,109 filed Dec. 24, 2011, which claims the benefit of priority to U.S. Provisional Patent Application No. 61/427,720 filed Dec. 28, 2010, each of which are incorporated herein by reference.

FIELD OF DISCLOSURE

The present invention generally relates to gas turbine engine airfoil shaped components such as vanes and rotatable blades, and more particularly, but not exclusively, to compressor blades and vanes.

BACKGROUND

Improving the performance of gas turbine engines remains an area of interest. Some existing systems have various shortcomings relative to certain applications. Accordingly, there remains a need for further contributions in this area of technology.

SUMMARY

According to one aspect, an apparatus comprises a gas turbine engine including a compressor for increasing a total pressure of a working fluid prior to delivery to a combustor for mixing with fuel. The compressor has a plurality of airfoil members that extend between a first flow surface and a second flow surface. The plurality of airfoil members have a first camber shape at a tip portion that provides a cumulative integral according to the relationship $$0.4 < \frac{\int_0^1 \left[ \int_0^x \beta' dx \right] dx}{\int_0^1 \beta' dx} \leq 0.5$$

where x is chord location, $$\beta' = \frac{\beta_i - \beta}{\beta_i - \beta_e},$$

$\beta_i$ is inlet metal angle, $\beta_e$ is exit metal angle, and $\beta$ is a camber angle at a given chord location.

Other aspects and advantages will become apparent upon consideration of the following detailed description and the attached drawings wherein like numerals designate like structures throughout the specification.

DETAILED DESCRIPTION OF THE ILLUSTRATIVE EMBODIMENTS

Figure 6:
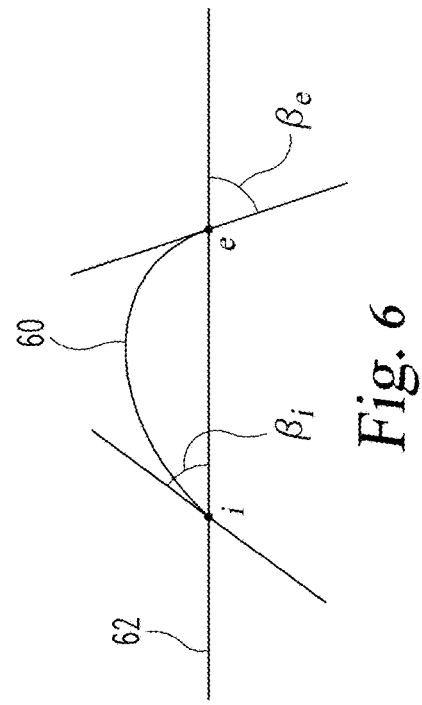
FIG. 6 depicts a camber angle.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
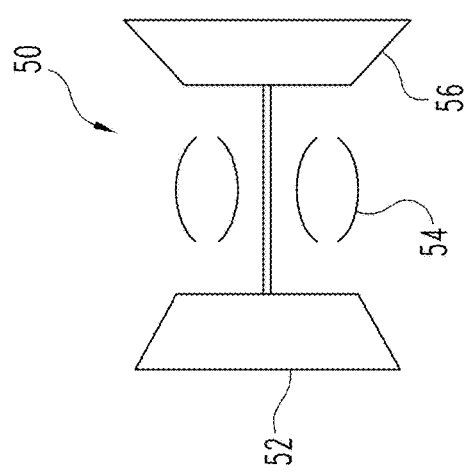
FIG. 1 depicts an embodiment of a gas turbine engine.

With reference to FIG. 1, one embodiment of a gas turbine engine 50 is illustrated and includes a compressor 52, combustor 54, and turbine 56. In one form the gas turbine engine 50 can be coupled with an aircraft to provide propulsive power. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

In operation of the gas turbine engine 50 the compressor 52 receives a working fluid such as air and compresses the working fluid before being delivered to the combustor 54. The combustor 54 mixes the compressed working fluid with a fuel and burns the mixture to produce a core flow having products of combustion. The turbine 56 receives and expands the core flow to produce power to drive the compressor 52. The gas turbine engine 50 can take a variety of forms including turbojet, turbofan, turboprop, and turboshaft. In addition, the gas turbine engine 50 can be a variable or adaptive cycle engine, can have centrifugal flow components alternatively and/or additionally to axial flow components, and can include additional components than those depicted in the illustrative embodiment, among other possible variations. In short, the gas turbine engine 50 can take on a variety of different embodiments.

Figure 2:
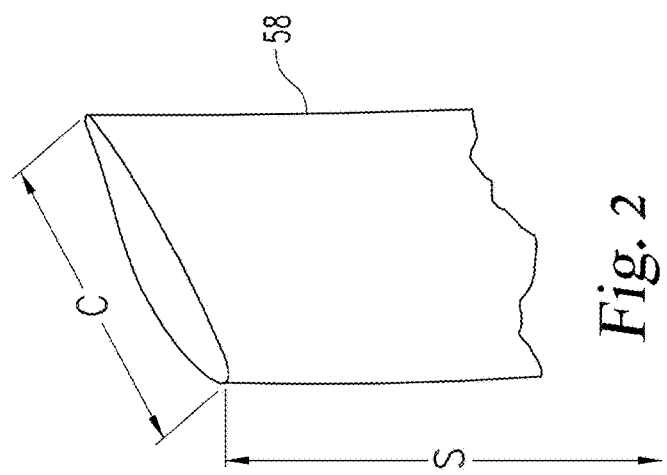
FIG. 2 depicts an embodiment of a compressor airflow member.

Turning now to FIG. 2, the compressor 52 of FIG. 1 includes an airflow member 58 disposed within the flowpath and operable to alter a direction of a flow of working fluid passing through the compressor 52. In some embodiments the airflow member 58 can be a rotating compressor blade or a relatively fixed stator vane. The airflow member 58 can have an airfoil-like aerodynamic shape that includes characteristics such as chord, span, camber, mean camber line, and camber angle.

The shape of the airflow member 58 in the present application produces a number of unique design-point and off-design-point characteristics of efficiency, pressure ratio, and operating range. The shape also reduces tip-gap flow, among other possible characteristics. As will be described further below, the shape generally includes a relatively large change in camber angle for the first portion of the blade chord with a relatively flat camber angle distribution for the remaining majority of the blade. To set forth one non-limiting example, the airflow member 58 can have a relatively large change in chamber angle near the leading edge that occurs within about the first 5% of blade chord. Near the leading edge and tip of the airflow member 58 the pressure surface includes a relatively large concave region that serves to produce a relatively low increase in static pressure rise on the pressure surface. The relatively flat camber angle distribution for the majority of the blade at the tip results in a reduced suction-peak Mach number. The combination of reduced suction-surface suction peak and the local static pressure on the pressure-surface tends to reduce the overall driving pressure difference across the rotor tip. The effect also serves to produce a localized jet of stream-wise momentum flow. In addition to the shape of the camber angle just described near the leading-edge and tip of the airflow member 58, in some forms the airflow member 58 can also have a relatively large change in camber angle near its trailing edge.

Figure 3:
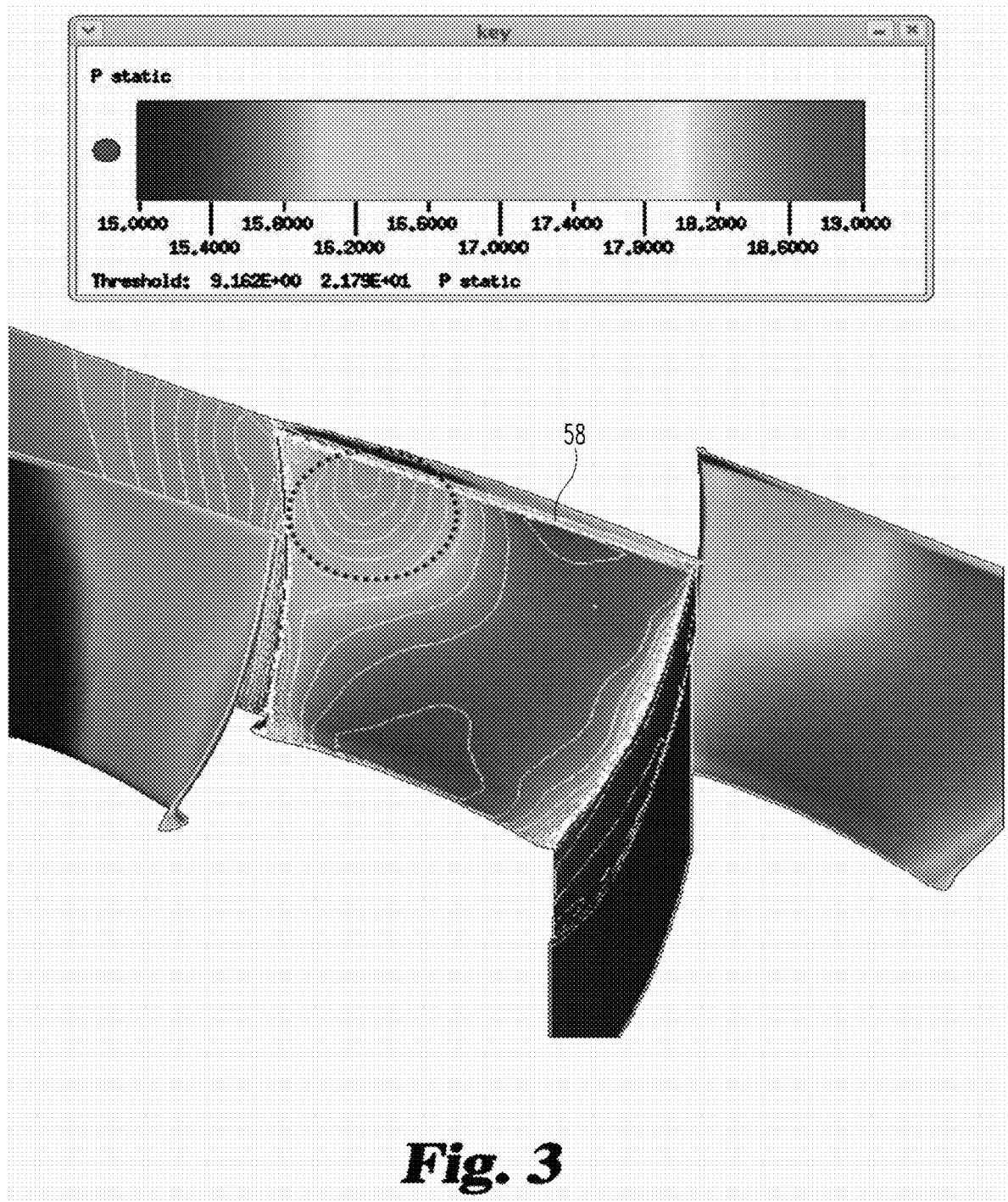
FIG. 3 depicts CFD analysis of an embodiment of a compressor airflow member.
Figure 4:
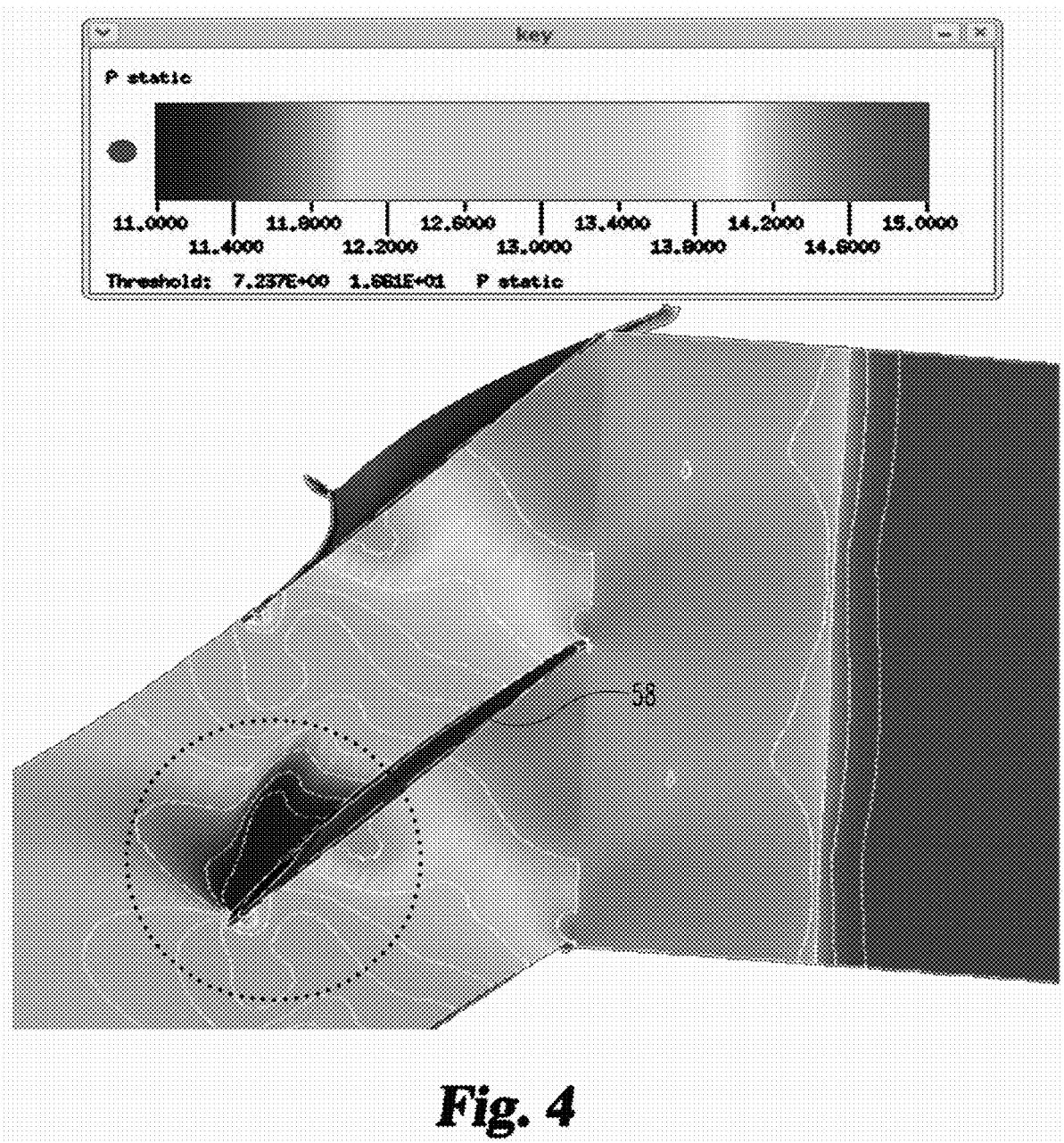
FIG. 4 depicts CFD analysis of an embodiment of a compressor airflow member.
Figure 5:
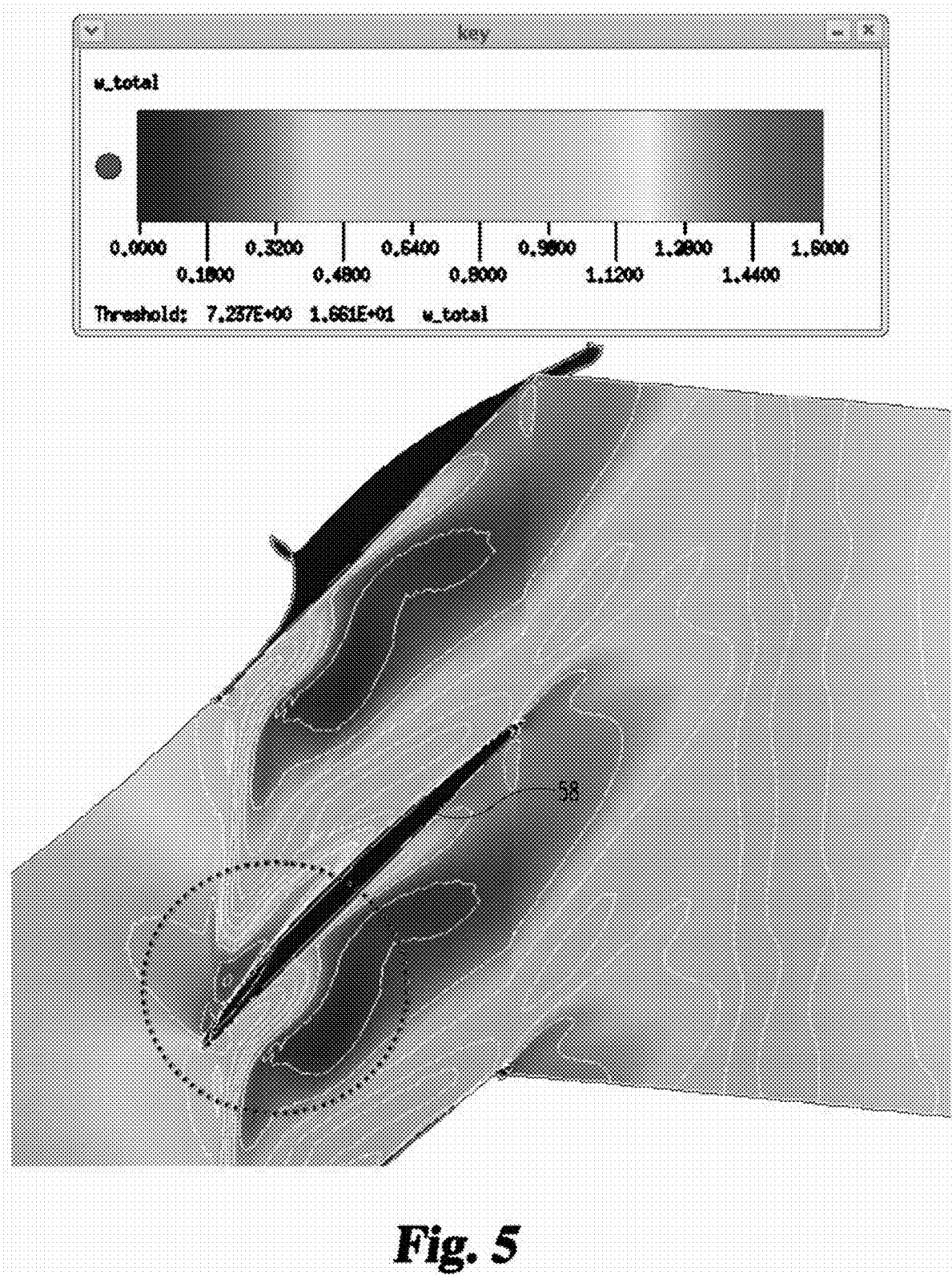
FIG. 5 depicts CFD analysis of an embodiment of a compressor airflow member.

FIGS. 3, 4, and 5 depict one form of the airflow member 58 and its effects on static pressure and velocities. Computational fluid dynamics (CFD) analysis was performed on the airflow member 58 and shows a reduced static pressure region, and resultant increased velocity region, near the leading edge of the tip region of the airflow member 58. The dashed circle in FIG. 3 highlights the pressure surface of the airflow member 58 in the tip region, and in particular highlights the local decrease in static pressure relative to the rest of the airflow member 58. FIG. 4, a view looking down the span of the airflow member 58, also shows the local decrease in static pressure of the pressure-side within the dashed circle. In addition, the view of FIG. 4 shows that the pressure-surface low pressure region occurs at approximately the same true chord fraction as the suction-surface pressure suction peak. The pressure-surface static pressure is initially high near the leading edge, it reduces along the chord of the airflow member 58 before increasing again at approximately the 30%-40% true chord. FIG. 5 depicts rotor tip velocity contour. The dashed circle is again positioned near the leading edge of the airflow member 58 and it encircles a region of the pressure side where the relatively low pressure causes a local stream-wise acceleration of the flow which is roughly depicted by the arrow. The induced flow acts like a localized fluid jet. The increase in stream-wise momentum, coupled with a reduction in the driving circumferential pressure gradient that induces the leakage flow across the tip, reduces the magnitude and penetration of the leakage flow into the flow passage. Such an effect can help to delay the onset of tip stall.

Turning now to a more detailed discussion of the properties of the airflow member 58, FIG. 6 depicts a camber line 60 extending from the point i, representing the inlet to the airfoil section of the airflow member 58, to a point e representing the exit of the airfoil section. The points i and e are arranged along the line 62. In one form the camber line 60 is the mean camber line and the line 62 is the chord line. The angle $\beta_i$ represents the inlet metal camber angle and the angle $\beta_e$ represents the exit metal camber angle. As will be appreciated, any point along the camber line 60 will have a camber angle $\beta$ just as the points i and e have a camber angle. In one form of the airflow member 58, the camber angle distribution of the airfoil section follows according to the relationships $$\beta' = \frac{\beta_i - \beta}{\beta_i - \beta_e} \quad (1)$$

$$\beta' = \left[\frac{1}{2} + \frac{1}{2^3}\{\ln(1 - k + 2kx') - \ln(1 + k - 2kx')\}\right]^n \quad (2)$$

where $\beta'$ is normalized camber angle, $\beta_i$ is inlet metal angle, $\beta_e$ is exit metal angle, $\beta$ is the camber angle at a given normalized chord location, x' is normalized chord, and n and k are constants. In one form k=0.96 and n=0.25.

Figure 7:
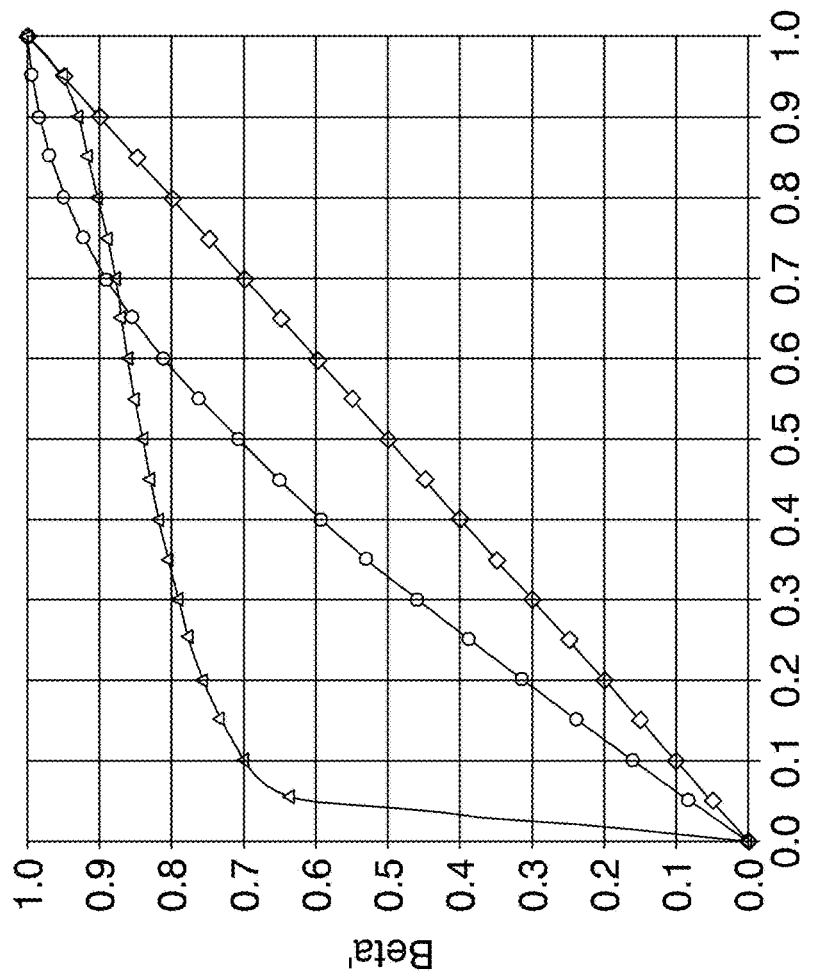
FIG. 7 depicts a chart comparing an embodiment of an airflow member against other designs.

FIG. 7 depicts the distribution of normalized camber angle against normalized chord for one embodiment of the present application plotted against distributions for other designs. As will be apparent from the figure, the depicted embodiment of the present application experiences a relatively high level of turning in the first 5% of true chord and a relatively flat camber-angle distribution for the majority of the chord length downstream of the leading-edge region. In other embodiments of the airflow member 58, the normalized camber angle is at least 0.5 in the first 10% of normalized chord. In still other embodiments the normalized camber angle is at least 0.5 in the first 5% of normalized chord. In yet other embodiments the normalized beta is at least 0.6 in the first 10% of normalized chord.

In one form the camber angle distribution of the present application can be expressed as a cumulative integral as shown with the equation $$0.4 < \frac{\int_0^1 \left[\int_0^x \beta' dx\right] dx}{\int_0^1 \beta' dx} \leq 0.5 \quad (3)$$

where x represents chord. The lower bound of the cumulative integral can range anywhere between 0.4 and 0.4695. To set forth just a few non-limiting examples, in some forms the lower bound of the cumulative integral is 0.42. In still other forms the lower bound of the cumulative integral is 0.45. In still further forms the lower bound of the cumulative integral is 0.46.

Figure 8:
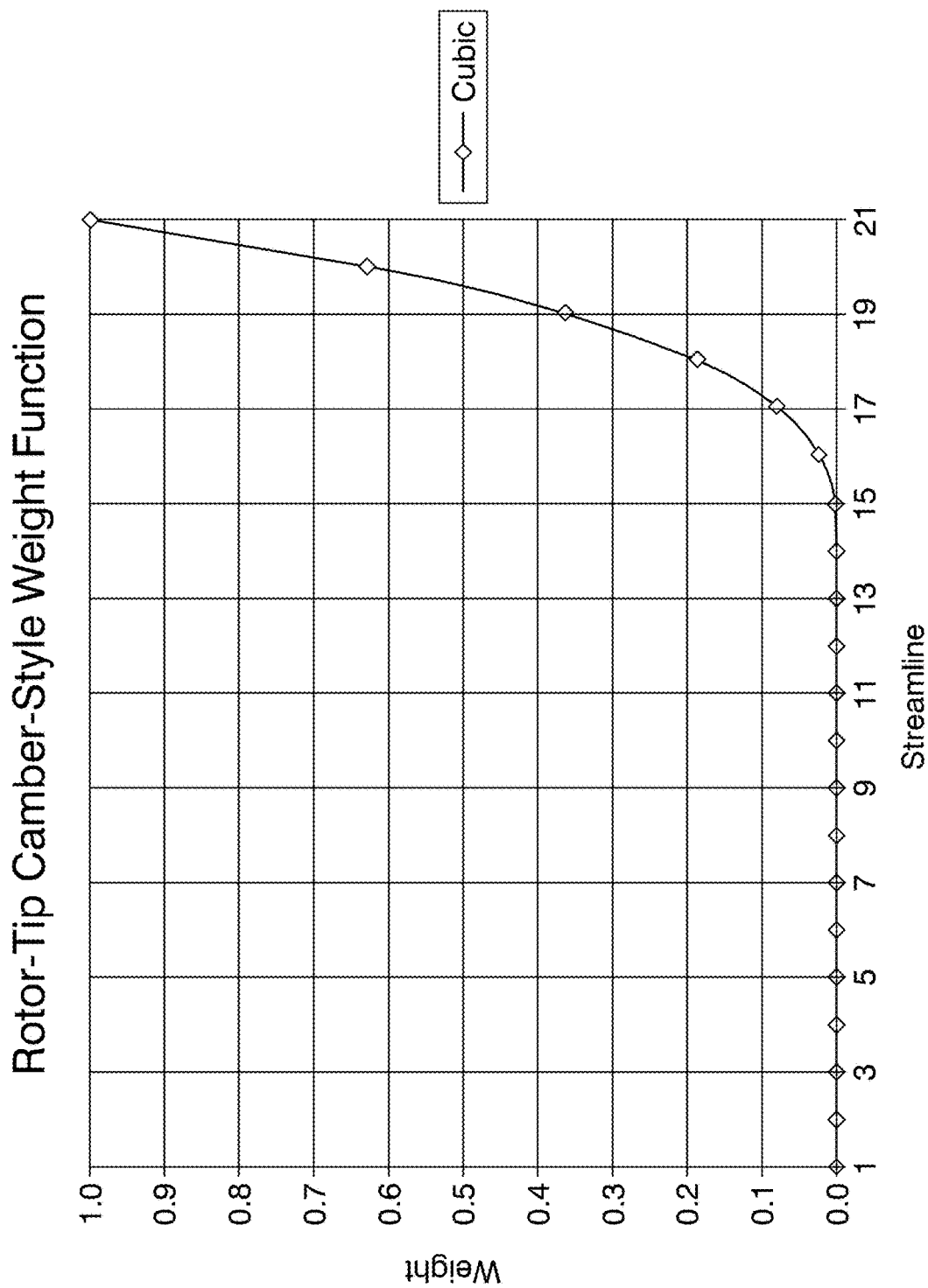
FIG. 8 depicts a weighting distribution.

The relationships described above regarding the camber angle are with respect to a camber angle at a given span location of the airflow member 58. In one non-limiting form the camber angle relationships and embodiments described above relate to the camber angle distribution at the tip of the airflow member 58. In some applications the camber angle distribution described above can be blended into a camber angle distribution of a main part of the airflow member 58. Such a blending can start at a variety of span height locations and proceed to the tip. To set forth just one non-limiting example, the blending can start at approximately ⅔ span of the airflow member 58. Various techniques can be used to blend the main part of the airflow member to the camber angle distribution discussed above. For example, the blending can be accomplished by a weighted average from a minimum at the blend point to a maximum at the tip. In some embodiments the blending can occur in a cubic weighted distribution. Other embodiments can include other distributions such as quadratic or hyperbolic tangent distributions, to set forth just two non-limiting alternatives. FIG. 8 discloses a non-limiting weight function of a cubic blending. In the embodiment disclosed, the streamline number 21 corresponds to full span height. The blending begins in the embodiment of FIG. 8 at about streamline 15.

The maximum thickness location of the tip camber style can occur at a number of chord locations, but in one non-limiting embodiment the location is about the half true chord location. The location of the maximum thickness can be blended into the main blade maximum thickness location with a weighting distribution following that of the camber blending, to set forth just one non-limiting example.

Figure 9:
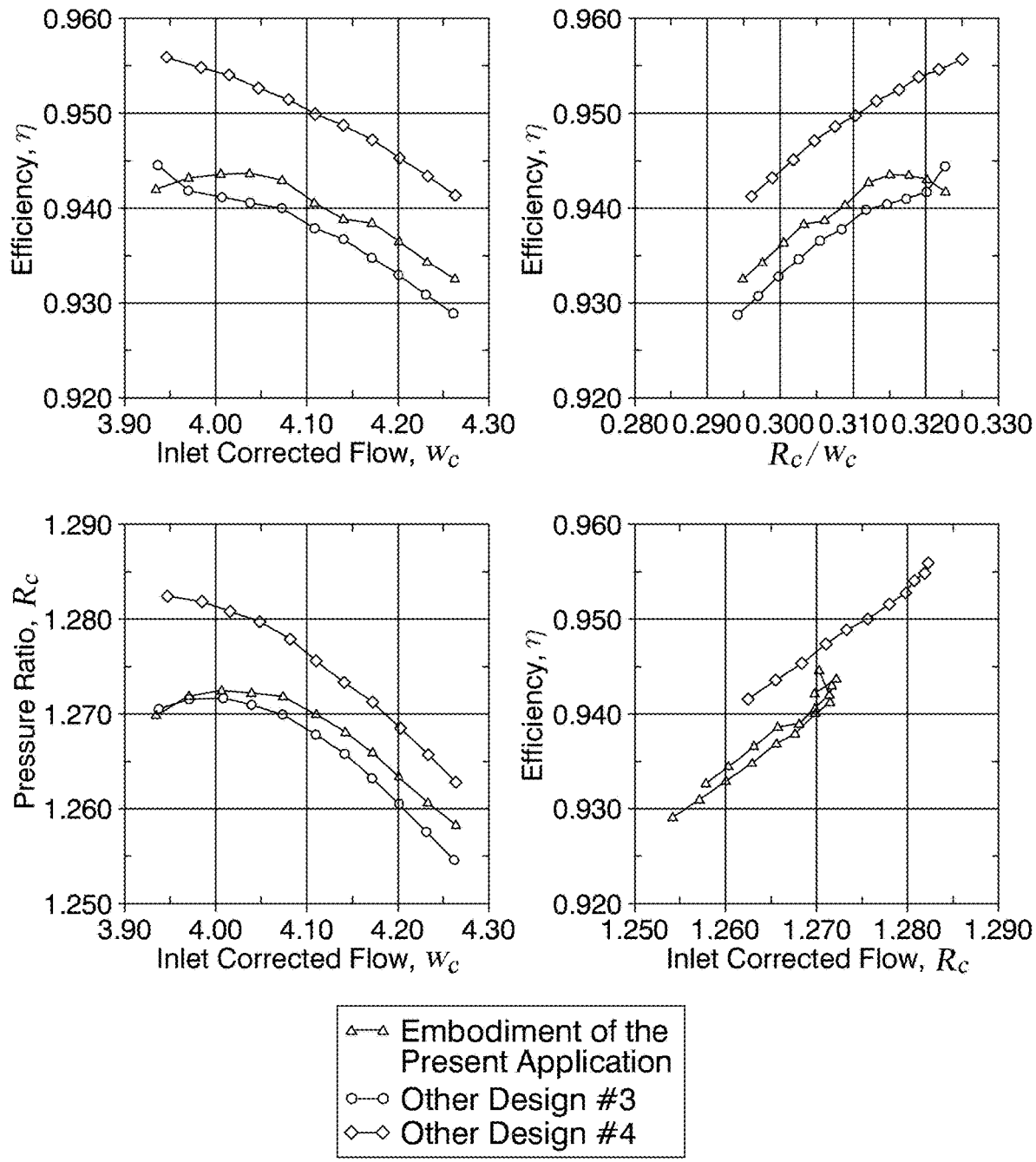
FIG. 9 depicts a performance of an embodiment of a compressor airflow member.

FIG. 9 illustrates various performance characteristics of one embodiment of the airflow member 58. As can be seen from the figure, greater efficiencies and pressure ratios are provided across a range of pressure ratios and inlet corrected flows.

Some features of the airflow member 58 can be adjusted when incorporating a tip camber style into a main airflow member 58 style. For example, the trailing edge metal angle may need to be adjusted to counter the effect of a rapidly varying setting/stagger angle in the tip region which may be caused by the nature of the camber style at the tip and also the manner in which the tip camber style is blended into the main portion of the airflow member 58.

One aspect of the present application provides an apparatus comprising a gas turbine engine having a compressor, a compressor airfoil member disposed in the compressor and having a gap between a tip of the compressor airfoil member and a flow surface of the compressor, the compressor airfoil member having a camber angle variation along a chord and a concave pressure side surface at the tip of the compressor airfoil member from a leading edge to an intermediate-chord location that results in a normalized beta of at least 0.4 in the first 10% of normalized chord, and wherein normalized beta is defined as $$\beta' = \frac{\beta_i - \beta}{\beta_i - \beta_e}$$

where $\beta_i$ is inlet metal angle, $\beta_e$ is exit metal angle, and $\beta$ is the camber angle at a given chord location.

Yet another aspect of the present application provides an apparatus comprising a gas turbine engine having a compressor, a compressor airfoil member disposed in the compressor and having a camber angle variation along a chord and a concave pressure side surface at the tip of the compressor airfoil member from a leading edge to an intermediate-chord location that results in a normalized beta of at least 0.4 in the first 10% of normalized chord, and wherein normalized beta is defined as $$\beta' = \frac{\beta_i - \beta}{\beta_i - \beta_e}$$

where $\beta_i$ is inlet metal angle, $\beta_e$ is exit metal angle, and $\beta$ is the camber angle at a given chord location.

One feature of the present application provides wherein the normalized beta is at least 0.5 in the first 10% of normalized chord.

Another feature of the present application provides wherein the normalized beta is at least 0.5 in the first 5% of normalized chord.

A still further feature of the present application provides wherein the normalized beta is at least 0.6 in the first 10% of normalized chord.

Yet still a further feature of the present application provides herein the normalized beta follows the equation $$\beta' = \left[\frac{1}{2} + \frac{1}{2^3}\{\ln(1-k+2kx') - \ln(1+k-2kx')\}\right]^n$$

where x' is normalized chord and n and k are constants.

Yet still another feature of the present application provides wherein k=0.96 and n=0.25.

Still yet another feature of the present application provides wherein the compressor airfoil member is operable to increase a pressure of a working fluid flowing through the compressor during operation of the gas turbine engine.

Still a further feature of the present application provides means for blending the camber angle variation at the tip of the compressor airfoil member to a camber angle variation at an intermediate height of the compressor airfoil member.

Yet another feature of the present application provides wherein the distribution of normalized beta along the normalized chord includes an inflection point at a mid-chord location.

Another aspect of the present application provides an apparatus comprising a gas turbine engine including a compressor for increasing the total pressure of a working fluid prior to delivery to a combustor for mixing with fuel, the compressor having a plurality of airfoil members that extend between a first flow surface and a second flow surface and form gaps between ends of the airfoil members and the second wall, the plurality of airfoil members having a camber shape at their tips that provides a cumulative integral according to the relationship $$0.4 < \frac{\int_0^1 \left[\int_0^x \beta' dx\right] dx}{\int_0^1 \beta' dx} \leq 0.5$$

where x is chord location, $$\beta' = \frac{\beta_i - \beta}{\beta_i - \beta_e},$$

$\beta_i$ is inlet metal angle, $\beta_e$ is exit metal angle, and $\beta$ is the camber angle at a given chord location.

Still another aspect of the present application provides an apparatus comprising a gas turbine engine including a compressor for increasing the total pressure of a working fluid prior to delivery to a combustor for mixing with fuel, the compressor having a plurality of airfoil members that extend between a first flow surface and a second flow surface, the plurality of airfoil members having a camber shape at their tips that provides a cumulative integral according to the relationship $$0.4 < \frac{\int_0^1 \left[\int_0^x \beta' dx\right] dx}{\int_0^1 \beta' dx} \leq 0.5$$

where x is chord location, $$\beta' = \frac{\beta_i - \beta}{\beta_i - \beta_e},$$

$\beta_i$ is inlet metal angle, $\beta_e$ is exit metal angle, and $\beta$ is the camber angle at a given chord location.

A feature of the present application provides wherein the lower bound of the cumulative integral is 0.42.

Another feature of the present application provides wherein the camber shape at the tips is blended into a main portion of the plurality of airfoil members at an intermediate blade height.

Still yet another feature of the present application provides wherein the camber shape at the tips is blended into a main portion of the plurality of airfoil members at about ⅔ of the height of the plurality of airfoil members.

Still a further feature of the present application provides wherein the camber shape at the tips is blended into a camber shape in the main portion of the plurality of airfoil members with a weighted average between the two shapes.

Yet still a further feature of the present application provides wherein the camber style at the tips is blended into the camber style in the main body of the plurality of blades using a cubic weighting distribution.

A yet still further feature of the present application provides wherein the camber shape at the tips includes a maximum thickness-to-chord at about 50% chord.

Another feature of the present application provides wherein the normalized beta follows the equation $$\beta' = \left[\frac{1}{2} + \frac{1}{2^3}\{\ln(1-k+2kx') - \ln(1+k-2kx')\}\right]^n$$

where x' is normalized chord, k=0.96, and n=0.25.

Yet another aspect of the present application provides an apparatus comprising a compressor blade of a gas turbine engine capable of being rotated to produce a pressure rise in a working fluid during operation of the gas turbine engine, the compressor blade including a main blade portion having a first camber shape that is blended with a tip portion having a second camber shape, the second camber shape producing a relatively low pressure near the leading edge of the tip to induce a local jet of stream-wise momentum flow.

A feature of the present application provides wherein the second camber shape is blended into the first camber shape at about ⅔ of the height of the compressor blade.

Another feature of the present application provides wherein the second camber shape is blended into the first camber shape with a weighted average.

A further feature of the present application provides wherein the maximum thickness-to-chord of the second camber shape is at about the mid-chord location.

A still further feature of the present application provides wherein the second camber shape includes a normalized camber angle defined as $$\beta' = \frac{\beta_i - \beta}{\beta_i - \beta_e}$$

where $\beta_i$ is inlet metal angle, $\beta_e$ is exit metal angle, and $\beta$ is the camber angle at a given chord location, and wherein normalized camber angle is at least 0.6 in the first 10% of normalized chord.

Still yet another feature of the present application provides wherein the second camber shape provides a cumulative integral according to the relationship $$0.4 < \frac{\int_0^1 \left[\int_0^x \beta' dx\right] dx}{\int_0^1 \beta' dx} \leq 0.5$$

where x is chord location, $$\beta' = \frac{\beta_i - \beta}{\beta_i - \beta_e},$$

$\beta_i$ is inlet metal angle, $\beta_e$ is exit metal angle, and $\beta$ is the camber angle at a given chord location.

Still another feature of the present application provides wherein the lower bound of the cumulative integral is 0.42.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

I claim:
1. An apparatus comprising:
 a gas turbine engine including a compressor for increasing a total pressure of a working fluid prior to delivery to a combustor for mixing with fuel, the compressor having a plurality of airfoil members that extend between a first flow surface and a second flow surface, the plurality of airfoil members having a first camber shape at a tip portion that provides a cumulative integral according to the relationship

$$0.4 < \frac{\int_0^1 \left[\int_0^x \beta' dx\right] dx}{\int_0^1 \beta' dx} \leq 0.5$$

where x is chord location, $$\beta' = \frac{\beta_i - \beta}{\beta_i - \beta_e},$$

$\beta_i$ is inlet metal angle, $\beta_e$ is exit metal angle, and $\beta$ is a camber angle at a given chord location.

2. The apparatus of claim 1, wherein the lower bound of the cumulative integral is 0.42.

3. The apparatus of claim 1, wherein the first camber shape is blended into a main portion of the plurality of airfoil members at an intermediate blade height.

4. The apparatus of claim 3, wherein the first camber shape is blended into a second camber shape at the main portion of the plurality of airfoil members at about ⅔ of a height of the plurality of airfoil members.

5. The apparatus of claim 3, wherein the first camber shape is blended into a second camber shape in the main portion of the plurality of airfoil members with a weighted average between the two shapes.

6. The apparatus of claim 4, wherein the first camber shape is blended into the second camber shape in the main body of the plurality of blades using a cubic weighting distribution.

7. The apparatus of claim 1, wherein the first camber shape includes a maximum thickness-to-chord at about 50% chord.

8. The apparatus of claim 1, wherein the normalized camber angle follows the equation $$\beta' = \left[ \frac{1}{2} + \frac{1}{2^3} \{\ln(1 - k + 2kx') - \ln(1 + k - 2kx')\} \right]^n$$

where x' is normalized chord, k=0.96, and n=0.25.

* * * * *